United States Patent [19]

Boileau

[11] 3,783,925
[45] Jan. 8, 1974

[54] TIRE HAVING BI-BIASED CARCASS

[75] Inventor: Jacques Boileau, Clermont-Ferrand, France

[73] Assignee: Compagnie Generale des Etablissements Michelin, raison sociale Michelin & Cie, Clermont-Ferrand, France

[22] Filed: Mar. 2, 1972

[21] Appl. No.: 231,105

[30] Foreign Application Priority Data
Mar. 8, 1971 France .............................. 71.08006
Jan. 14, 1972 France .............................. 72.01371

[52] U.S. Cl. ............................... 152/356, 152/354
[51] Int. Cl. .............................................. B60c 9/06
[58] Field of Search ............................ 152/354, 356

[56] References Cited
UNITED STATES PATENTS
2,703,128  3/1955  Darrow .............................. 152/356
532,189    1/1895  Sloper ............................... 152/356
3,672,423  6/1972  Duduk ............................... 152/356
3,568,750  3/1971  Henning ............................. 152/354
3,605,849  9/1971  Boileau ............................. 152/356

Primary Examiner—Gerald M. Forlenza
Assistant Examiner—Robert Saifer
Attorney—Granville M. Brumbaugh et al.

[57] ABSTRACT

A tire has an asymmetrical carcass comprising two plies of cords forming a network of quadrilateral meshes. The sides of the quadrilaterals form with the circumferential direction of the tire acute angles $\alpha$ and $\beta$ which are different and which vary as a function of the distance of the mesh from the axis of the tire. The angle $\alpha$ is larger than the angle $\beta$ and varies, between any two points located at different distances from the axis, more than does the angle $\beta$. In manufacturing the tire by turning the edges of the two plies around bead wires on a building drum and then shaping the assembly into the form of a tire, at least one of the bead wires is permitted to rotate about the axis of the tire so that the meshes rotate about normals to the carcass.

13 Claims, 38 Drawing Figures

PATENTED JAN 8 1974　　　　　　　　　　　3,783,925

$$\frac{ZC}{ZA} = \frac{ZC'}{ZA'} = 1.6$$

PATENTED JAN 8 1974 3,783,925

TIRE HAVING BI-BIASED CARCASS

BACKGROUND OF THE INVENTION

This invention relates to pneumatic tires for wheels of all vehicles: passenger cars, delivery vans, trucks, buses, earth-moving vehicles, airplanes, etc. More particularly, the invention relates to pneumatic tires having a novel and highly-effective carcass reinforcement, i.e., the reinforcement that extends through the two sidewalls and below the tread of the tire.

There are two types of conventional carcass reinforcement--radial and bias.

The radial reinforcement is composed of cords or cables arranged in radial planes of the tire. It is always used with a crown reinforcement or belt reinforcing the tread. The flexibility of the radial reinforcement and the rigidity of the belt result in well known advantages: high cornering power, reduced wear and increased comfort. However, the radial reinforcement also has drawbacks, namely vulnerability of the sidewalls, lack of stability of the tire under certain conditions and limited maximum speed.

The bias reinforcement is composed of cords or cables arranged obliquely with respect to the radial planes of the tire along two symmetrical directions: the cords form diamonds, one of the diagonals of which is in a radial plane and the shape and area of which vary as a function of the distance from the axis of the tire but the sides of which are of constant length. This type of reinforcement has the drawback of producing too uniform a reinforcement of the different regions of the tire since the variations in shape and area of the diamond meshes are not of such a nature and degree that one can assign to each region the shape and area which are suitable for it. The result is that one cannot obtain simultaneously a substantially undeformable tread and beads, particularly in the circumferential direction, and highly deformable sidewalls, particularly in the radial direction.

SUMMARY OF THE INVENTION

An object of the invention is to provide a tire comprising a carcass reinforcement that is less vulnerable and less deformable in the circumferential direction than the radial carcass reinforcement and that imparts greater deformability to the sidewalls and more rigidity to the tread and beads than does the bias carcass reinforcement. Another object of the invention is to provide a tire comprising a carcass by virtue of which the tire, if it has no tread-reinforcing ply, has properties superior to those of the conventional bias tire. Another object of the invention is to provide a tire comprising a carcass by virtue of which the tire, if it has a tread-reinforcing ply, has properties superior to those of a conventional radial tire.

The foregoing and other objects are attained in accordance with the invention by the provision of a tire comprising a carcass reinforcement of special "bi-biased" construction. The reinforcement comprises cords forming a set of quadrilateral meshes the sides of which are parallel in pairs and oriented therefore in two directions and is characterized in that adjacent sides of the meshes make with the circumferential direction different acute angles $\alpha$ and $\beta$ that increase or decrease simultaneously as a function of the distance from the mesh to the axis of the tire, the larger angle $\alpha$ varying between any two points located at different distances from the axis more than smaller angle $\beta$.

The cords defining the angles $\alpha$ and $\beta$ are disposed in a pattern that is asymmetrical about the median and radial planes of the tire. This is in contrast to the conventional bias carcass, in which the meshes are formed of sides arranged symmetrically with respect to the circumferential direction or the radial direction.

In one embodiment of the invention, the ratio R = sine $\alpha$/sine $\beta$ is constant and greater than 1 for all or at least a portion of the meshes. In this case, the sides of the meshes are of invariable lengths, independent of the distance to the axis of the tire.

The ratio R in accordance with the invention is between 1.1 and 10. Preferably R is greater than 2, and more particularly 2.5 or 3. When R is greater than 2, the angle $\beta$ cannot exceed 30°. If R is greater than 3, the angle $\beta$ is everywhere less than 20° (and even 19-½°). The result is that the reinforcement then comprises cords which have an orientation which differs only slightly, if at all, from the circumferential orientation, this being true at all points of their path. On the other hand, the cords which intersect them can assume locally a radial orientation in the sidewalls without excluding a practically circumferential orientation in the beads or under the tread.

However, the ratio R cannot assume too large a value if it is desired that the shaping ratio $t$, that is to say, the ratio of the largest diameter (below the tread) to the smallest diameter (in the beads), have an acceptable value. It is necessary to satisfy the relation $1 < R < (t+1)/(t-1)$ or $t < (R+1)/(R-1)$. This leads to selecting R less than 5 in order to have a shaping ratio of at least 1.5 and even less than 3.5 in order to have slightly higher shaping ratio.

Besides the parameter R, another important element is the value of the angle $\gamma$ (or 180°−$\gamma$) which the sides of the meshes form with each other. It is desirable that $\gamma$ vary within wide limits between its minimum value $\gamma_o$ in the beads and its maximum value $\gamma_s$ below the tread. Thus, $\gamma_o$ and $\gamma_s$ are such that a) sine $\gamma_o$ and/or sine $\gamma_s$ is equal to or less than $\sqrt{(R^2-1)}/(R)$ and preferably is equal to or less than $(R^2-1)/(R^2+1)$. Also, the sum of $\gamma_o$ and $\gamma_s$ is equal to or close to 180°. These conditions result in the following consequences:

a. Adjacent sides of a mesh have a slope of the same sign in the beads: that is, they are in the same quadrant defined by the circumferential and radial directions; they have slopes of opposite sign below the tread, their directions being in adjacent quadrants.

b. The angles $\alpha_o$ and $\beta_o$ in the beads have a sum of less than 90°; the same is true of the angles $\alpha_S$ and $\beta_S$ below the tread.

c. The meshes have the same minimum area in the beads and under the tread, which has the result that the reinforcement cords that are parallel to each other are the same distance apart in the beads as below the tread.

The method of the invention for producing a tire carcass comprises the steps of superimposing on a building drum at least two plies of cords which are parallel in each ply but arranged in such a manner as to intersect from one ply to the other, placing the bead wires on the assembly, turning the edges of the plies up around the bead wires, and shaping the blank thus produced. The method is characterized in that the cords of the two plies form unequal acute angles $\alpha_o$ and $\beta_o$ with the circumferential direction so as to make the carcass blank asymmetrical and in that during the shaping at least one and preferably both bead wires are left free to rotate around the axis of the blank so that it assumes its equilibrium position.

Preferably the slopes of the cords defining the angles $\alpha_o$ and $\beta_o$ have the same sign: that is, the cords of the two plies are in non-adjacent quadrants defined by the circumferential and transverse directions of the building drum. The sum of $\alpha_o$ and $\beta_o$ is preferably less than 90°. Preferably, finally, the ratio sine $\alpha_o$/sine $\beta_o$ is between 2 and 5, and more particularly between 2.5 and 3.5.

Experience shows that the shaping is effected without difficulty if the bead wires are left free to rotate and if one does not interfere with the rotation of the cords around the intersections, avoiding adherence of the carcass to the shaping element (for instance a shaping bladder). In this case, the meshes are transformed from the initial state on the building drum to the final state of the carcass by respecting the constancy of the lengths of the sides, and therefore the constancy of the ratio $R = $ sine $\alpha$/sine $\beta$, with an excellent degree of approximation over the major part of the surface of the carcass.

With respect to the physical structure of the reinforcement plies, it is preferable to adopt the following measures:

a. For the cords which are slightly inclined to the circumferential direction, it is preferable to use elastic metal or textile cords: cords of polyamide or elastic or superelastic steel cables, for instance.

b. For the cords which are more inclined to the circumferential direction, it is preferable, on the contrary, to select inelastic metal or textile cords: rayon cords or ordinary steel cords, for instance.

c. Preferably the ply (or plies) of only slightly inclined cords is located on the outside of the ply (or plies) of more inclined cords.

d. Between the two plies (or groups of plies) there is placed a layer of rubber, preferably of slight thickness and of relatively high modulus of elasticity. The thickness may be similar to that of a ply of cords; the modulus of elasticity may be from 200 to 500 g/mm² at 100 percent elongation.

e. In each ply the cords are arranged with a small spacing and are, for instance, practically adjoining.

f. There is placed over the carcass a tread reinforcement consisting, for instance, of two plies of steel cables arranged along two directions slightly inclined to the circumferential direction.

It goes without saying that more than two carcass plies can be used. For example, an additional two plies can be used the cords of which form unequal angles with the circumferential direction and form a net of meshes which is identical to that which is obtained in accordance with the invention with a carcass comprising only two plies.

BRIEF DESCRIPTION OF THE DRAWING

An understanding of other aspects of the invention can be gained from a consideration of the following detailed description of the preferred embodiments thereof, in conjunction with the appended figures of the drawing, wherein:

FIG. 1' is a schematic view in radial section of a conventional bias carcass, the shaping law of which is illustrated in FIG. 1;

FIG. 2' is a schematic view in radial section of a bi-bias carcass in accordance with the invention, the shaping law of which is illustrated in FIG. 2;

FIGS. 3 to 6 and their annexes 3A, 3B, . . . 3E, 4A, 4B, . . . 4E, 5A, 5C, 5E and 6A, 6C, 6E constitute other graphical examples of shaping of bi-bias carcasses in accordance with the invention;

DESCRIPTION OF THE PREFERRED EMBODIMENTS

In the different figures of the drawing, and in particular in FIGS. 7 to 10, there have been shown in the case of each ply only a few cords which are widely spaced from each other, while in the tire the cords are much closer to each other in each ply.

Figure 1:
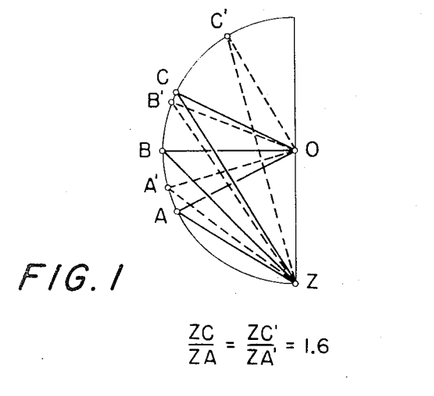
FIG. 1 is a schematic illustration of the shaping law of a conventional bias carcass.

FIG. 1 shows the shaping law of a conventional diamond carcass. Each diamond can be considered as having a base or reference side OZ and a second side OA, OB, or OC, depending on whether it is at the level A, B, or C of the tire indicated schematically in FIG. 1'. In FIG. 1 the points A, B, C are, of course, on the same circle, since the sides of all the diamonds are equal. On the tire, the diagonals ZA, ZB, ZC of the diamonds are parallel to the circumferential direction and their lengths are proportional to their distance from the axis of the tire. The ratio ZC:ZA is therefore the shaping ratio, that is to say, the ratio of the distances from the Z—Z axis of the extreme points C and A.

Figure 1A:
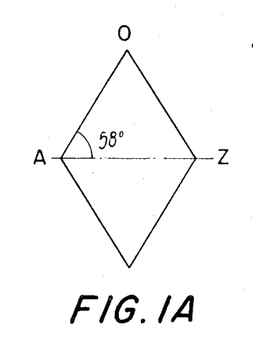
FIGS. 1A, 1B, 1C, 1A' and 1C' show, in two variants, the successive shapes of the unit mesh of a diamond net at various levels defined by the representative points A, B, C on the one hand and A', B', C' on the other hand in FIGS. 1 and 1'.
Figure 1B:
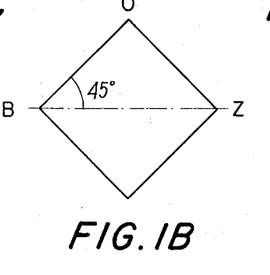
Figure 1C:
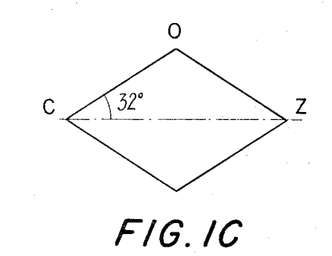

As FIGS. 1A, 1B, 1C show, in a conventional bias tire the shapes and areas of the diamond meshes vary little between the different levels--density and circumferential rigidity of the reinforcement are everywhere approximately the same. If it is desired to increase the density and the rigidity under the tread, the point C can be displaced to C' (FIGS. 1 and 1'). In order to retain the same shaping ratio, that is, the same ratio ZC':ZA', it is necessary to shift the point A to A' and similarly the point B to B'. There is obtained a more elongated mesh of smaller area at the crown (FIG. 1C') and in the portion of the sidewalls close to the tread. However, there is practically no change at the level of the bead wires (FIG. 1A'). One can thus not improve the density and orientation of the cords both under the tread and in the beads, nor avoid an undesirable increase in density in the vicinity of the tread.

Figure 2:
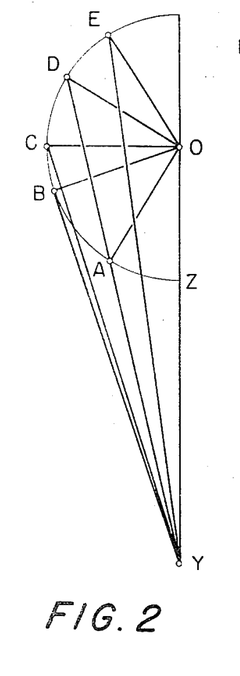
FIG. 2 is a schematic illustration of the shaping law of a bi-bias carcass in accordance with the invention.
Figure 2A:
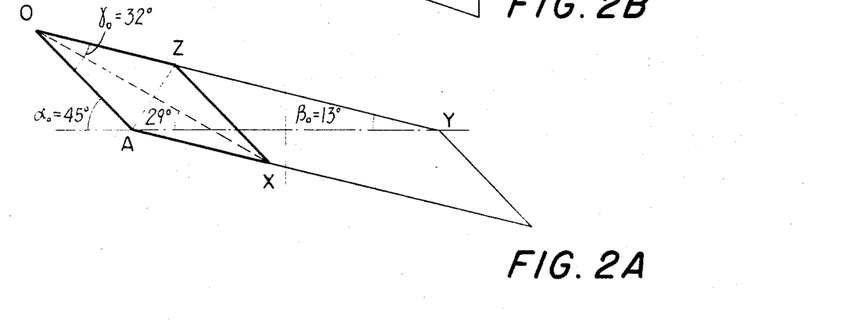
FIGS. 2A, 2B, 2C, 2D, 2E show the development of the shape of the unit mesh at levels A, B, C, D, E of FIGS. 2 and 2'.
Figures 2B, 2C:
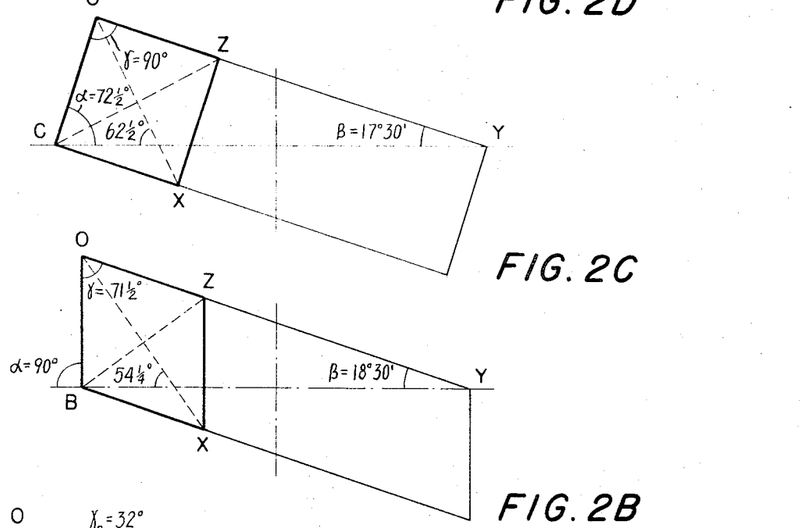
Figure 2D:
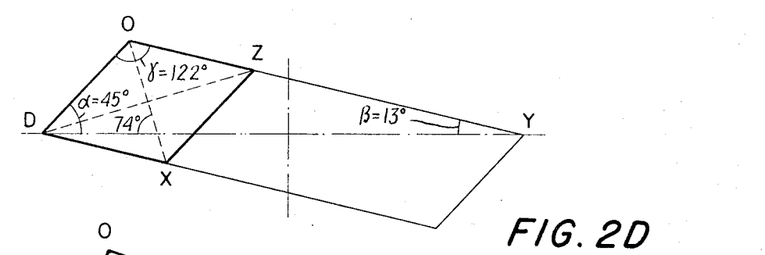
Figure 2E:
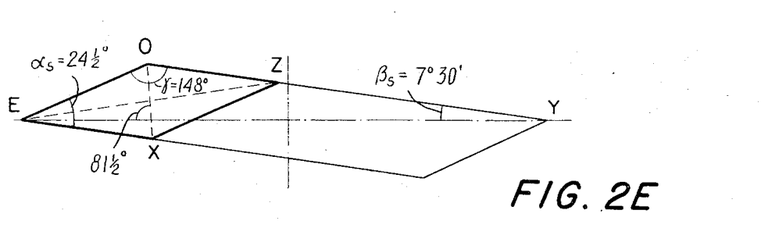

FIG. 2 and its corresponding figures show by way of comparison the advantages and possibilities of the invention. There has been selected a reinforcement formed of parallelogram meshes with sides in the same ratio R as the sines of the angles, the value selected for R being sine 45°/sine 13° = 3.144. This choice simplifies the graphical determination of the shapes and areas of the meshes.

In order to draw FIG. 2, the large side OY of the meshes was assumed fixed and the second sides OA, OB, OC, OD, OE of the meshes were drawn at the levels A, B, C, D, E of the tire schematically indicated in FIG. 2'. On the tire, the diagonals YA, YB, YC, YD, YE are parallel to the circumferential direction and their lengths are proportional to the distance to the axis Y—Y of the tire. The shaping ratio is the ratio YE:YA.

FIGS. 2A, 2B, 2C, 2D, 2E show how the shape and area of the meshes evolve, only half of which is seen in FIG. 2. When one passes from level A to level E, the large size OY retains a small inclination with respect to the circumferential direction, this inclination increasing from level A to level B and decreasing then from level B to levels C, D and E.

On the other hand, the small sides OA, OB, OC, OD, OE have a much more pronounced inclination, increasing from level A to level B and then decreasing from level B to levels C, D and E. It is only at level E that the two sides of the mesh are slightly inclined, although OE remains much more inclined than OY. It will be noted that at level B the side OB has a radial orientation; that at level C the angle of the sides with each other is a right angle, and the mesh has its maximum area; that at level D the inclinations are the same as at level A, this for an intermediate shaping ratio YD/YA of 1.60; that at level E the area of the mesh is the same as at level A and this for a final shaping ratio YE/YA of 1.73. The variation in shape and area of the mesh is thus considerable.

FIGS. 2A to 2E show in bold lines the contour of diamond meshes OAXZ, OBXZ, OCXZ, ODXZ, OEXZ the sides of which are parallel to but in part different in length from corresponding sides of the parallelogram meshes. The diagonals of the diamonds bisect the angles at O and at A, B, C, D, E respectively. The diagonals that bisect the angles at O are inclined to circumferential direction by an angle which successively assumes the values 29°, 54-¼°, 62-½°, 74° and 81-½°. The diagonals of the diamonds thus turn in the clockwise direction about normals to the carcass when passing from FIG. 2A to FIG. 2E; that is, from level A to level E. Such an inclined diamond network is obtained when the distance between the opposite sides of the meshes, that is, the distance between adjacent cords of the two reinforcement plies, is the same.

Figures 3, 3A, 3B, 3C, 3D, 3E:
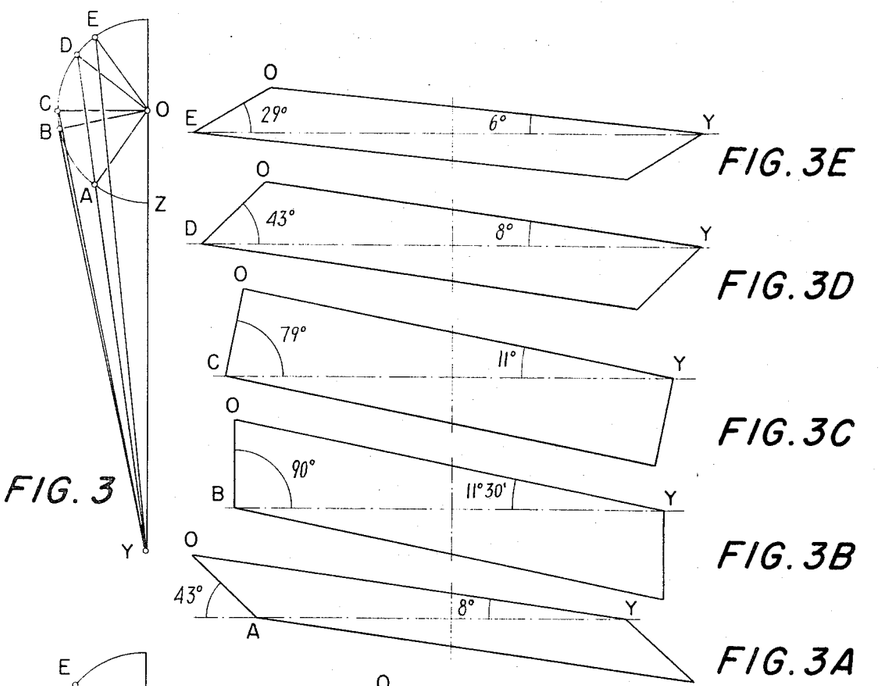
Figure 4:
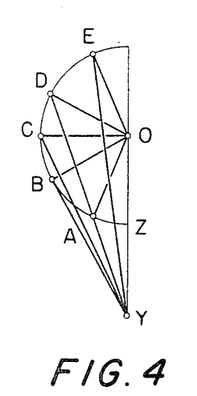
Figures 4A, 4B, 4C, 4D, 5E:
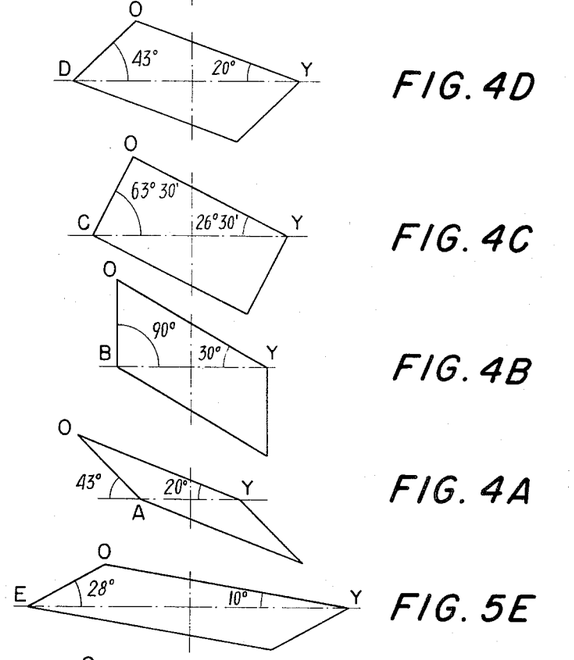
Figure 4E:
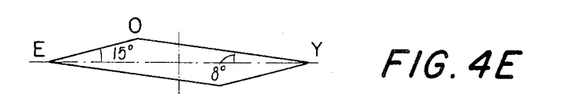
Figure 5:
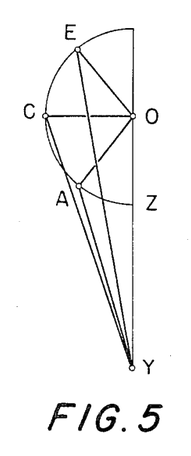
Figures 5A, 5C:
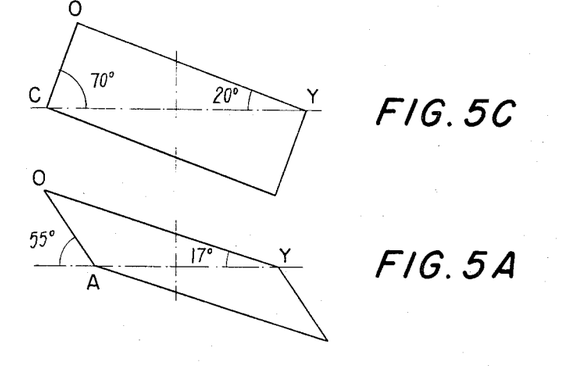
Figure 6:
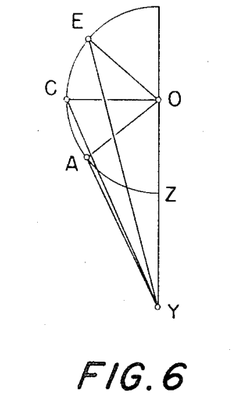
Figures 6A, 6C:
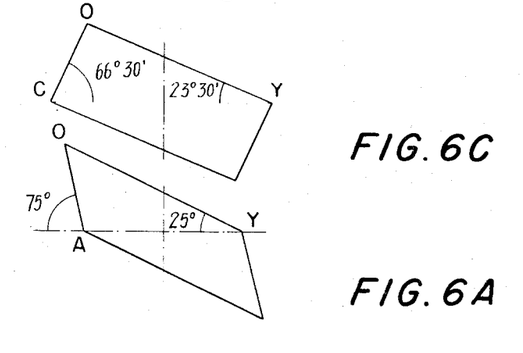
Figure 6E:
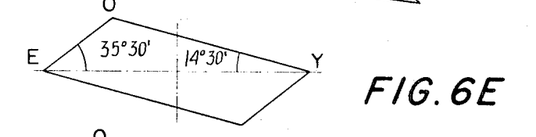

FIGS. 3 to 6 and their related figures show examples similar to that of FIG. 2 for other values of the ratio R, which equals 5 in the case of FIG. 3, 2 in the case of FIG. 4, 2.8 in the case of FIG. 5, and 2.3 in the case of FIG. 6. There are thus illustrated the case of a relatively large ratio R (FIG. 3), that of a small ratio (FIG. 4), and that of an average ratio R. There are also illustrated starting angles having a slope of the same sign and a sum less than 90° (FIG. 5) or greater than 90° (FIG. 6). These different figures reveal in particular the effect of the selection of the ratio R on the admissible shaping ratio, on the inclination of the cords of the meshes, and on the variation in area of the meshes. In general, the angle $\alpha$ is substantially within the range of 24½° to 90°, the angle $\beta$ is substantially within the range of 7-½° to 18-½°, and the angle $\gamma$ is substantially within the range of 32° to 148°.

FIGS. 7 to 10 illustrate the making and structure of a tire 10 in accordance with the invention, of a size 165 × 380.

Figure 7:
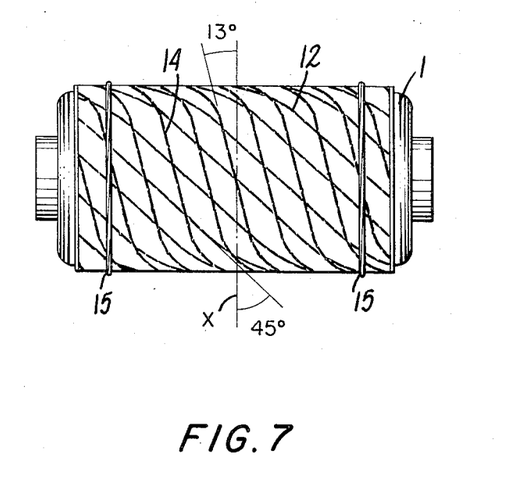
FIG. 7 is a view in elevation of a building drum and a tire carcass in accordance with the invention while being developed from the elements of FIG. 2.
Figure 8:
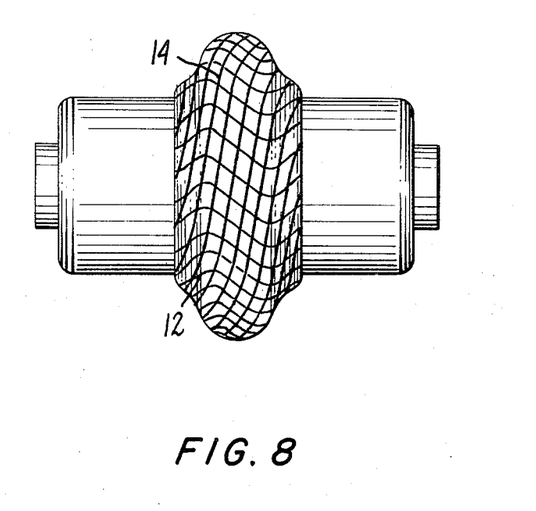
FIG. 8 is a view in elevation of the tire carcass of FIG. 7 after shaping.
Figure 10:
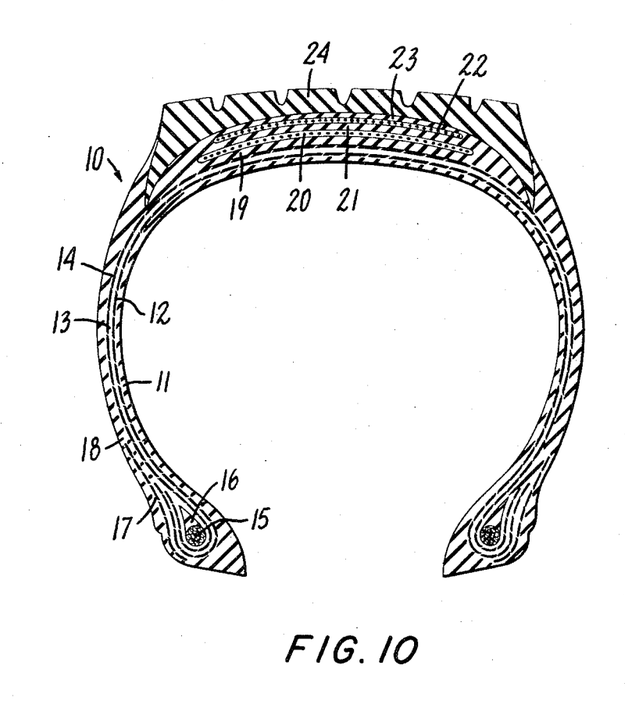
FIG. 10 is a view in radial section of a finished tire made in accordance with the invention.

FIG. 7 shows the making of the carcass on a building drum 1 provided with a shaping bladder (not shown). On the drum there is placed a layer of rubber 11 (FIG. 10) of a thickness of 1 mm and then a first carcass ply 12 of rayon cords calender-coated in rubber. The cords of the ply 12 which in reality practically adjoin each other are inclined 45° towards the left. The ply 12 has a width of 345 mm. On the ply 12 there is placed an interposed layer 13 of a thickness of 0.8 mm of relatively hard rubber (modulus of elasticity of 350 g/mm² at 100 percent elongation). The second carcass ply 14 of polyamide cords calender-coated in a suitable rubber compound is then applied. This ply 14 has a width of 355 mm and its cords, which also practically adjoin each other, are inclined 13° towards the left, that is to say, in the same direction as those of the ply 12. The bead wires 15, spaced 279 mm apart, and the bead fillers 16 are then applied (FIG. 10). The edges of the plies 12 and 14 and of the layers 11 and 13 are then turned up around the bead wires 15. Stiffeners 17 (FIG. 10) of steel cables and the sidewall rubber 18 are then applied. The making of the carcass is completed. In order to impart to it a toric shape, the bladder interposed between the carcass and the building drum is inflated, which imparts to the carcass the shape shown in FIG. 8. During the shaping, the bead wires, or at least one of them, must be left free to move towards each other and to rotate around the axis of the drum since they are driven in rotation as a result of the deformation of the meshes and undergo a substantial relative angular displacement (of the order of 90°).

After the shaping of the carcass there is placed on its crown, as shown in FIG. 10, an intermediate layer of rubber 19, a first tread reinforcing ply 20 of a width of 134 mm of steel cables inclined 22° towards the right, a second interposed layer 21, a second tread reinforcing ply 22 of a width of 122 mm, also of steel cables but inclined 19° towards the left, a final interposed layer 23 and the tread 24. Vulcanization is then effected in the customary manner.

Figure 9:
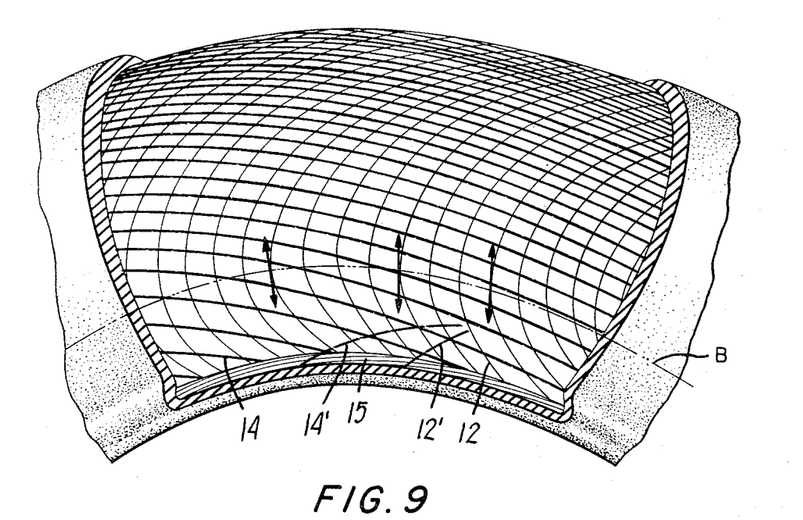
FIG. 9 is a perspective view, partly broken away, of a sector of the carcass shaped in accordance with FIG. 8.

FIG. 9 shows a sector of the carcass with the rubber broken away to show the orientation of the cords 12 and 14. The cords 12 have over a short length a radial orientation marked by arrows at the level of the longitudinal line B. The cords 14 are only slightly inclined to the longitudinal direction indicated by the line B. There is shown at 12' and 14' by means of single cords the orientations of the portions of the plies 12 and 14 which are turned around the wire bead 15.

A tire manufactured in this manner has been tested and compared with a radial carcass tire of the same size. The tire of the invention has a remarkable superiority in many ways, including limit speed (it increases from 217 km/hr to 267 km/hr), strength of the sidewalls and straight-line stability.

Thus there are provided in accordance with the invention a basically new kind of tire and a method of manufacturing it. The new tire marks an advance over the conventional radial tire just as the radial tire marked an advance over the old bias-ply tire. Many modifications of the representative embodiments disclosed herein which are within the spirit and scope of the invention will readily occur to those skilled in the art upon a consideration of the disclosure. Accordingly, the invention is to be construed as including all of the embodiments thereof within the scope of the appended claims.

I claim:

1. A tire comprising a pair of beads and a carcass reinforcement comprising at least two plies of cords, said cords being continuous from bead to bead and forming a network of quadrilateral meshes the sides of which are parallel in pairs and oriented in two directions, the sides of the meshes forming with the circumferential direction of the tire acute angles $\alpha$ and $\beta$ which are different, thus rendering the reinforcement asymmetrical, said acute angles $\alpha$ and $\beta$ both varying as a function of the distance of the mesh from the axis of the tire, the angle $\alpha$ being larger than the angle $\beta$ and varying, between any two points located at different distances from the axis, more than does the angle $\beta$.

2. A tire comprising a carcass reinforcement comprising cords forming a network of quadrilateral meshes the sides of which are parallel in pairs and oriented in two directions, the sides of the meshes forming with the circumferential direction of the tire acute angles $\alpha$ and $\beta$ which are different, thus rendering the reinforcement asymmetrical, and which vary as a function of the distance of the mesh from the axis of the tire, the angle $\alpha$ being larger than the angle $\beta$ and varying, between any two points located at different distances from the axis, more than does the angle $\beta$, wherein over at least part of the carcass including points located at different distances from the axis the ratio $R = \text{sine } \alpha/\text{sine } \beta$ is constant and greater than 1.

3. A tire according to claim 2 wherein $1.1 < R < 10$.

4. A tire according to claim 2 wherein $2 < R < 5$.

5. A tire according to claim 2 wherein $2.5 < R < 3.5$.

6. A tire according to claim 2 wherein the region of the carcass nearest the axis, the sides form with each other angles $\gamma_o$ and $180°-\gamma_o$ such that sine $\gamma_o \leq \sqrt{(R^2-1)}/(R)$.

7. A tire according to claim 1 wherein, in the region of the carcass nearest the axis, the sides of the meshes are in the same quadrants defined by the circumferential and radial directions and thus have a slope of the same sign.

8. A tire according to claim 6 wherein sine $\gamma_o \leq (R^2-1)/(R^2+1)$.

9. A tire according to claim 6 wherein the angles $\alpha_o$ and $\beta_o$ in the region of the carcass nearest the axis have a sum of less than 90°.

10. A tire according to claim 6 wherein, in the region of the carcass farthest from the axis, the angles $\gamma$ and $180°-\gamma$ assume values $\gamma_S$ and $180°-\gamma_S$ such that $\gamma_o$ and $\gamma_S$ have a sum substantially equal to 180°.

11. A tire according to claim 6 wherein, in the region of the carcass farthest from the axis, the areas of the meshes and the spacings between parallel cords are respectively the same as the areas of the meshes and the spacings between parallel cords in the region of the carcass nearest the axis.

12. A tire according to claim 1 wherein the cords forming the smaller angle $\beta$ with the circumferential direction are more elastic than the cords forming the larger angle $\alpha$ and are disposed on the outside of the cords forming the angle $\alpha$, further comprising a layer of rubber interposed between the cords forming the angle $\alpha$ and the cords forming the angle $\beta$, the rubber having a modulus of elasticity within the range of 200 to 500 g/mm² at 100 percent elongation.

13. A tire according to claim 10 wherein the angle $\alpha$ is substantially within the range of 24-½° to 90°, the angle $\beta$ is substantially within the range of 7-½° to 18-½°, and the angle $\gamma$ is substantially within the range of 32° to 148°.

* * * * *